United States Patent
Cohen et al.

(10) Patent No.: US 9,685,063 B2
(45) Date of Patent: Jun. 20, 2017

(54) CAR SEAT OCCUPANT DETECTION AND ALERT APPARATUS, SYSTEM, AND METHOD

(71) Applicant: Pidyon Controls Inc., New York, NY (US)

(72) Inventors: Yochanan Cohen, New York, NY (US); Jay P. Sbrollini, Pleasant Valley, NY (US)

(73) Assignee: PIDYON CONTROLS INC., New York, NY (US)

( * ) Notice: Subject to any disclaimer, the term of this patent is extended or adjusted under 35 U.S.C. 154(b) by 298 days.

(21) Appl. No.: 14/486,384

(22) Filed: Sep. 15, 2014

(65) Prior Publication Data

US 2016/0078737 A1    Mar. 17, 2016

(51) Int. Cl.

| | |
|---|---|
| B60Q 1/00 | (2006.01) |
| G08B 21/02 | (2006.01) |
| B60N 2/00 | (2006.01) |
| B60N 2/26 | (2006.01) |
| G08B 5/22 | (2006.01) |
| H04W 4/14 | (2009.01) |
| G08B 25/08 | (2006.01) |

(52) U.S. Cl.
CPC ......... *G08B 21/0205* (2013.01); *B60N 2/002* (2013.01); *B60N 2/26* (2013.01); *G08B 5/223* (2013.01); *G08B 21/0283* (2013.01); *G08B 25/08* (2013.01); *H04W 4/14* (2013.01)

(58) Field of Classification Search
None
See application file for complete search history.

(56) References Cited

U.S. PATENT DOCUMENTS

| | | |
|---|---|---|
| 2,911,652 A | 11/1959 | Ekman |
| 3,015,104 A | 1/1962 | Crosson et al. |
| 3,023,134 A | 2/1962 | Creswell et al. |
| 3,479,666 A | 11/1969 | Webb |
| 4,106,124 A | 8/1978 | Green |
| 5,638,544 A | 6/1997 | Sump |
| 6,846,012 B2 | 1/2005 | Baskin et al. |
| 6,922,147 B1 | 7/2005 | Viksnins et al. |
| 6,947,071 B2 | 9/2005 | Eichmann |
| 7,796,021 B2 | 9/2010 | Saban |
| 7,802,320 B2 | 9/2010 | Morgan |
| 8,016,676 B2 | 9/2011 | Carter |
| 8,020,220 B2 | 9/2011 | McElroy et al. |

(Continued)

*Primary Examiner* — Julie Lieu
(74) *Attorney, Agent, or Firm* — Gordon & Jacobson, P.C.

(57) ABSTRACT

A car seat occupant detection system for a car seat installed in a vehicle is provided. The system includes at least one harness sensor for detecting whether connectors of a car seat harness are connected and a weight sensor for detecting the weight of an occupant in the car seat. The system includes a controller in communication with the at least one harness sensor and the weight sensor. The system includes a transceiver configured to selectively communicate with a driver device via a local wireless link and with a third party device via a wide area wireless link. The controller determines whether or not an occupant in the car seat has been abandoned by a driver based on detections of the at least one harness sensor, the weight sensor, and communication range status between the transceiver and the driver communication device via the local wireless link.

16 Claims, 4 Drawing Sheets

(56) References Cited

U.S. PATENT DOCUMENTS

| | | |
|---|---|---|
| 8,235,461 B2 | 8/2012 | Cohen |
| 8,640,267 B1 | 2/2014 | Cohen |
| 8,659,414 B1 * | 2/2014 | Schuk ................ G08B 21/0202 307/10.1 |
| 8,768,292 B2 | 7/2014 | Welch |
| 9,189,943 B1 * | 11/2015 | Rambadt ............ G08B 21/0205 |
| 2001/0032351 A1 | 10/2001 | Nakayama et al. |
| 2003/0062996 A1 | 4/2003 | Flanagan et al. |
| 2003/0122662 A1 | 7/2003 | Quinonez |
| 2003/0222775 A1 | 12/2003 | Rackham et al. |
| 2005/0030188 A1 * | 2/2005 | Flanagan ................ B60R 99/00 340/667 |
| 2005/0200465 A1 | 9/2005 | Fabors et al. |
| 2011/0203024 A1 | 8/2011 | Morgan |
| 2012/0232749 A1 * | 9/2012 | Schoenberg ........... B60N 2/002 701/36 |
| 2013/0033373 A1 * | 2/2013 | Thomas ................ B60N 2/002 340/457.1 |
| 2013/0049955 A1 * | 2/2013 | Hoover .................... B60N 2/28 340/539.11 |
| 2014/0184404 A1 * | 7/2014 | Schoenberg ........... B60N 2/002 340/457 |
| 2014/0253314 A1 * | 9/2014 | Rambadt ................ B60N 2/002 340/457.1 |
| 2014/0306838 A1 * | 10/2014 | Beumler .................. B60N 2/28 340/988 |
| 2015/0242820 A1 * | 8/2015 | Oz ......................... G08B 21/22 705/7.21 |
| 2016/0042624 A1 * | 2/2016 | Quave .................... G08B 21/02 340/457 |

\* cited by examiner

ALERT!
A CHILD HAS BEEN LEFT IN YOUR CAR.

PLEASE RETURN TO YOUR CAR IMMEDIATELY.

IF YOU DO NOT RETURN IN 5 MINUTES, FIRST RESPONDERS WILL BE NOTIFIED.

FIG. 4

ALERT

CHILD LOCATION: 10 MAIN STREET,

DRIVER ALERTED: YES

INTERNAL VEHICLE TEMPERATURE: 95F

TIME ELAPSED SINCE DETECTION: 5 MINUTES

FIG. 5

CAR SEAT OCCUPANT DETECTION AND ALERT APPARATUS, SYSTEM, AND METHOD

BACKGROUND

1. Field

The present disclosure relates to alarm systems. More particularly, the present disclosure relates to a car seat occupant detection and alert apparatus, system, and method, which can be employed to alert a driver and/or emergency personnel of the presence of an unattended child in a car seat in a vehicle.

2. State of the Art

Each year in the United States, dozens of children die as a result of heatstroke caused by being left unattended in motor vehicles. Such deaths are avoidable. Nevertheless, the number of deaths needlessly continues to rise due to a failure of drivers to remember to remove child passengers from parked vehicles when the drivers leave the vehicles.

SUMMARY

According to one embodiment, a car seat occupant detection and alert system is provided for a car seat installed in a vehicle. The system includes at least one harness sensor for detecting whether connectors of a car seat harness are connected and a weight sensor for detecting the weight of an occupant in the car seat. The system includes a controller in communication with the at least one harness sensor and the weight sensor. The system includes a transceiver configured to selectively communicate with a driver device via a local wireless link and with a third party device via a wide area wireless link. The controller determines whether or not an occupant in the car seat has been abandoned by a driver based on detections of the at least one harness sensor, the weight sensor, and communication range status between the transceiver and the driver communication device via the local wireless link.

According to another embodiment, a car seat occupant detection method is provided. The method includes detecting the presence of an occupant in the car seat and detecting whether a harness of the car seat is locked. Also, the method includes determining whether a driver communication device is beyond a first predetermined distance from the car seat. Further, the method includes sending a first alert message to the driver communication device when it is determined that an occupant is seated in the car seat, when it is detected that the harness is locked, and when it is determined that the driver communication device is beyond the first predetermined distance from the car seat.

In a case where the controller determines that an occupant in the car seat has been abandoned by a driver, the controller instructs the transceiver to send a first alert message to the driver communication device via the local communication link if the driver communication device is in communication range of the local communication link, or instructs the transceiver to send a second alert message to the third party communication device via a wide area wireless communication link if the driver communication device is not in communication range of the local communication link.

In one embodiment the local communication link is a Bluetooth communication link and the wide area wireless communication link is a cellular telephone link. In one embodiment, the transceiver includes a first transceiver and a second transceiver and the local communication link includes first and second local communication links. The first transceiver is configured to communicate with the driver communication device via the first local wireless communication link having a first communication range and the second transceiver is configured to communicate with the driver communication device via the second local wireless communication link having a second communication range that is larger than the first communication range.

BRIEF DESCRIPTION OF THE DRAWINGS

FIG. 4 is an example of a first alert message that is sent to a driver's communication device.

FIG. 5 is an example of a second alert message that is sent to a third party communication device.

DETAILED DESCRIPTION

Figure 1:
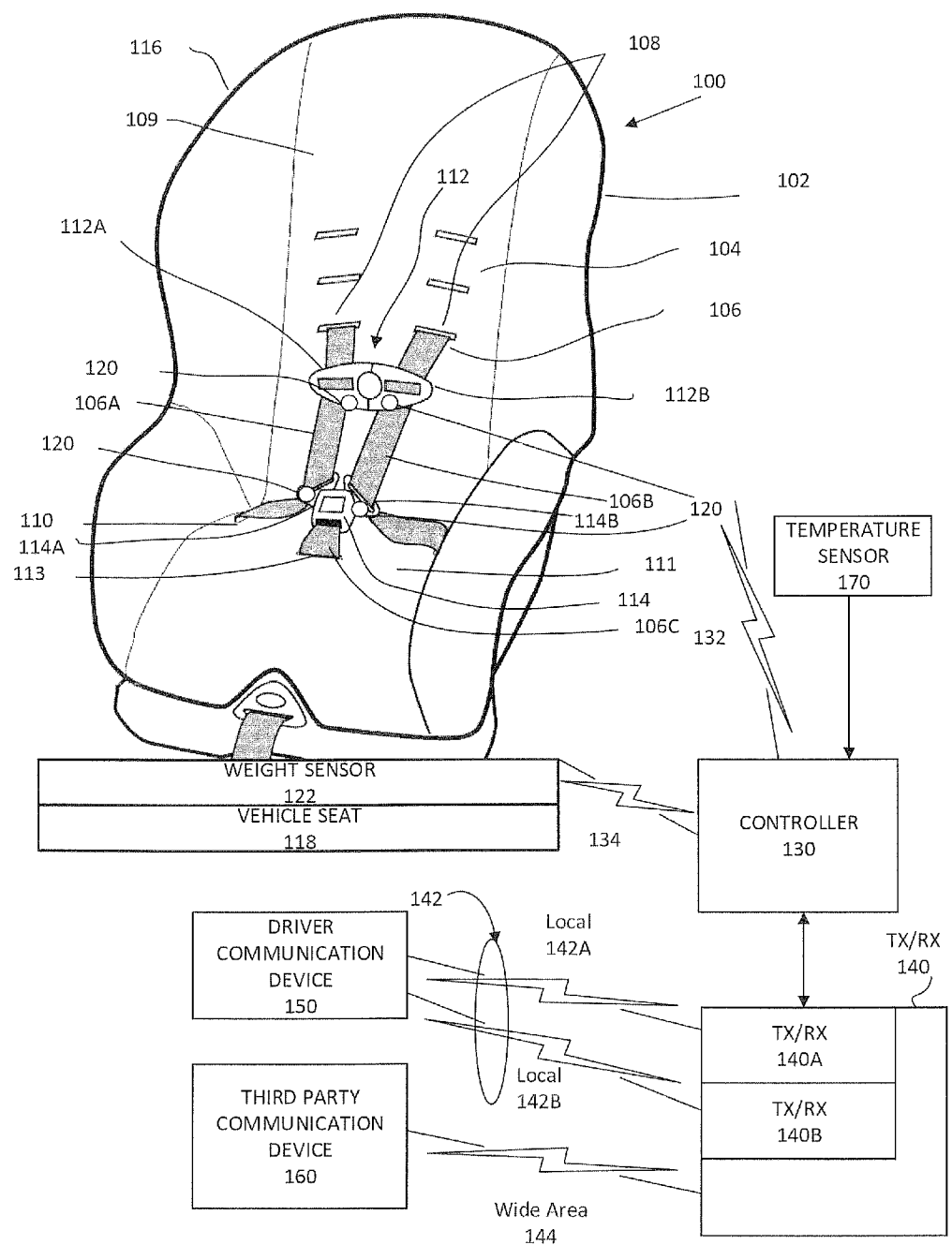
FIG. 1 is a schematic of an occupant detection system in accordance with an embodiment of the invention.

FIG. 1 is a schematic representation of an embodiment of a car seat occupant detection and alert system 100 for a car seat 102. The system 100 includes harness sensors 120, a weight sensor 122, a controller 130, a transceiver 140. The controller 130 is communicatively coupled to the harness sensors 120, the weight sensor 122, and the transceiver 140, as described more fully below. Optionally, the system may include a temperature sensor 170 that is communicatively coupled to the controller 130. Also, the system 100 is operatively communicatively coupled to a driver communication device 150 and a third party communication device 160, as described more fully below.

The car seat 102 can be any car seat used to transport infants or young children in a vehicle and which generally includes a seating surface 104 and a harness 106 extending from the seating surface 104 to restrain an occupant (i.e., an infant) in the seat 102, as is known in the art. The harness 106 may be a three- or five-point harness, as is also known in the art. In the embodiment shown in FIG. 1, the car seat 102 has a five-point harness 106. The five-point harness 106 has two straps 106A, 106B that extend from a shoulder area 108 on a seatback 109 of the seating surface 104 to a lower thigh area 110 on a seat bottom 111 of the seating surface 104. The two straps 106A, 106B are removably connected together with a chest buckle 112 that is comprised of a pair of mating connectors 112A, 112B located on respective straps 106A, 106B. A third strap 106c extends between the two straps 106A, 106B from a crotch area 113 of the seating surface 104 to a crotch buckle 114C. Respective connectors 114A, 114B on the straps 106A, 106B also connect to the crotch buckle 114C. The infant seat 102 also has an outer shell or frame 116, which is supported by a seat 118 of the vehicle when the car seat 102 is installed in (i.e., coupled to) the vehicle.

In one embodiment of the system 100 the harness sensors 120 may be coupled to the buckles 112, 114 and/or connectors 112A, 112B, 114A, 114B. The sensors 120 are configured to detect whether the mating connectors 112A/112B are connected together and whether connectors 114A, 114B are connected to buckle 114C.

While a single sensor 120 is shown on each connector 112A, 112B, 114A, and 114B in FIG. 1, it will be appreciated that other arrangements and numbers of sensors are possible.

Figure 2:
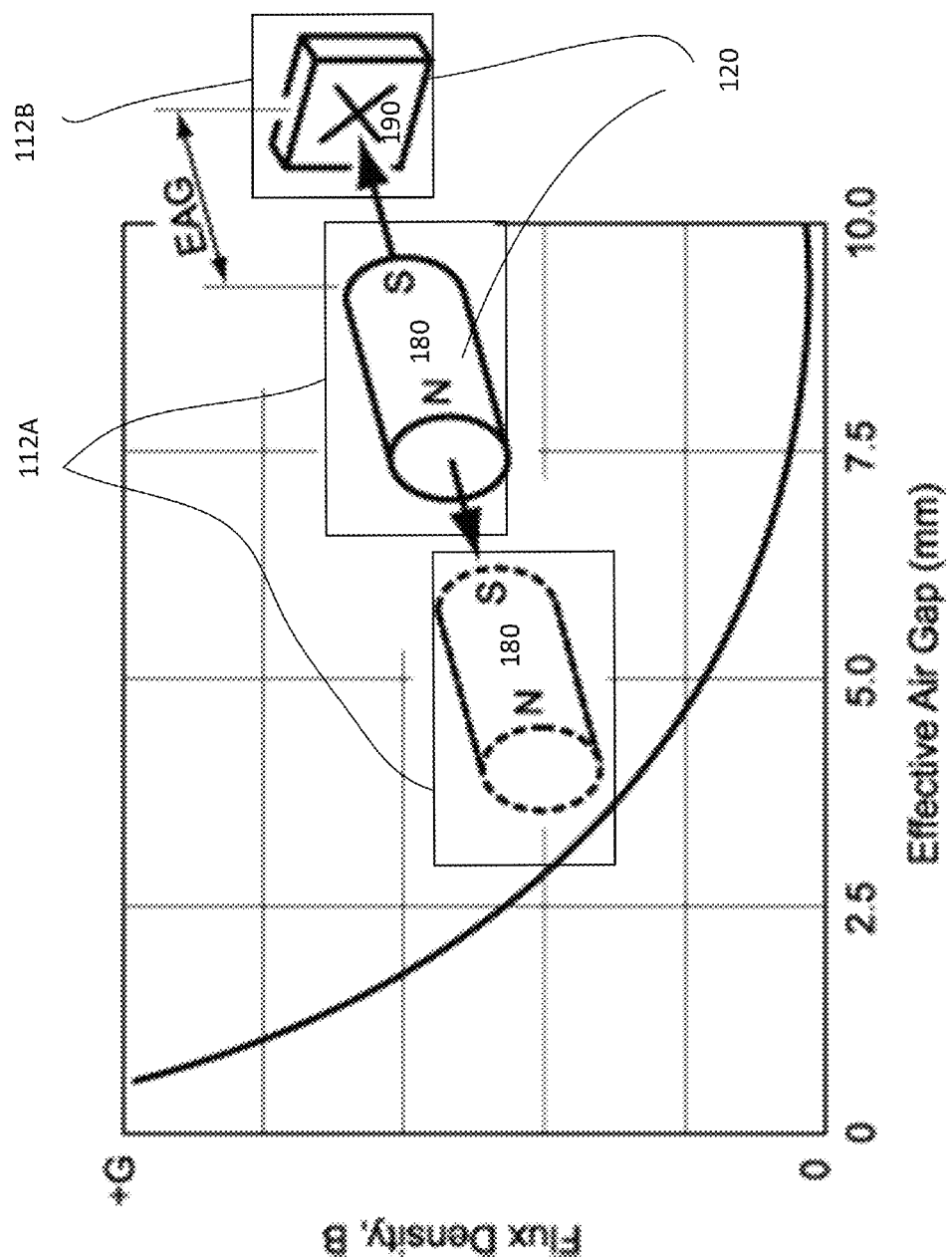
FIG. 2 is a graph showing flux density vs. effective air gap for a head-on configuration of an example of a Hall effect sensor.

More specifically, in one embodiment seen in FIG. 2, sensors 120 can be constructed as Hall-effect sensors that include a linear Hall-effect integrated circuit 190 and a magnet 180, to detect the proximity therebetween. For example, as shown schematically in FIG. 2, one of the harness sensors 120 includes one magnet 180 attached to connector 112A and one circuit 190 attached to connector 112B. Although not shown in FIG. 2, a second magnet 180 may be attached to connector 114A and a second linear Hall-effect integrated circuit 190 may be attached to connector 114B in the same manner as for connectors 112A and 112B. Due to the attachment of the magnets 180 to connectors 112A and 114A and the attachment of the circuits 190 to connectors 112B and 114B, the proximity detections of the circuits 190 are correlatable to the proximity between connectors 112A and 112B and between 114A and 114B. The linear Hall-effect integrated circuit 190 differentiates a change in magnetic field strength for one magnetic pole, which can be of either north or south polarity, as shown in FIG. 2. As the relative distance between the magnet 180 and the circuit 190 is reduced, the field detected by the integrated circuit 190 increases. Also, as shown in the graph in FIG. 2, the field strength decreases as the magnet 180 is displaced away from the circuit 190. In one embodiment, the circuit 190 outputs the field strength to the controller 130 (FIG. 1), which determines, based on the field strength, whether the connectors 112A/112B and 114A/114B are connected or disconnected. However, because the field strength is asymptotic as the proximity (i.e., effective air gap) approaches zero, in one embodiment the controller 130 is configured to interpret the field strength at a predetermined, non-zero effective air gap distance (e.g., 2.5 mm) as the field strength corresponding to positive closure of the connectors 112A/112B and 114A/114B. Similarly, the controller 130 may be configured to interpret a field strength that is less than the predetermined field strength as indicating that the connectors 112A/112B and 114A/114B, for example, are open.

In one embodiment, the harness sensors 120 may be integral with the connectors 112A, 112B, 114A, and 114B. Also, in one embodiment, the harness sensors 120 may be removably attached to the connectors 112A, 112B, 114A, and 114B. Such removable attachment may facilitate retrofitting harness connectors of a car seat that was not originally manufactured with harness sensors 120. Attachment of harness sensors to harness connectors may be by any conventional means, such as with fasteners. Each harness sensor 120 may be individually powered by its own power supply, such as a battery (not shown), or may be wired to receive power from a battery that powers one or more harness sensors 120.

In another embodiment, the harness sensors 120 may be constructed as electrical contacts (not shown) integrated with the connectors 112A, 112B, 114A, and 114B. The contacts of the connectors 112A, 112B, 114A, 114B may be connected together electrically in series and to an electrical continuity detector (not shown) which is configured to detect whether there is electrical continuity across the contacts of the mating connectors 112A, 112B and 114A, 114B, for example. The controller 130 may be configured to receive the output of such a continuity detector. The controller 130 may be configured so that the controller 130 interprets electrical continuity as an indication that all of the harness connectors 112A, 112B, 114A, and 114B are connected and electrical discontinuity as an indication that at least one of the harness connectors are disconnected. Therefore, owing to the series connection of the contacts of the connectors, even if only one of the connectors 112A, 112B, 114A, and 114B is not connected, a discontinuity will be detected and will be interpreted by the controller 130 as the harness 106 being unlocked. As noted hereinbelow, in at least one embodiment, the system 100 does not send any alert message if the harness 106 is unlocked. Such an arrangement may prevent false alarms of occupant detection when children are in the process of being strapped into and out of the car seat, which will likely occur when a driver of the vehicle is in visual contact of the occupant of the car seat and, therefore, assumed to be aware of the occupant's presence in the car. Such an arrangement may also prevent false alarms when a package, such as a bag of groceries, is placed on the car seat surface 104.

The weight sensor 122 senses the weight of an occupant or object on the seating surface 104 of the car seat 102. In one embodiment, the weight sensor 122 may have a weight range of about 4 lbs to 100 lbs, although other ranges are possible. In one embodiment, the weight sensor 122 may be a separable element from the car seat 102. For example, in one embodiment, the weight sensor 122 is positioned between the bottom of the car seat 102 and the vehicle seat 118. A separate weight sensor 122 may be useful for retrofitting an existing car seat 102 with the system 100. Alternatively, in one embodiment the weight sensor 122 may be integrated in a base (not shown) or frame 116 of the car seat 102 or between the seat surface 104 and the frame 116 of the car seat 102, for example. Regardless of the location of the weight sensor 122, the weight sensor 122 can be constructed as a conventional electronic weight sensor (or pressure sensor) that can output a weight signal to the controller 130. Rather than the weight sensor 122 being configured to output a weight signal, the sensor may alternatively be configured to output a binary signal based on whether or not the sensed weight is greater than a threshold weight of the occupant. For example, the weight sensor 122 may be configured to compare a sensed weight of an occupant seated in the car seat 102 with a predetermined weight, corresponding to a minimum weight of a child that is expected to occupy the car seat. If the sensed weight is greater than or equal to the predetermined weight, the sensor may output a binary signal (i.e., 1) to the controller 130 that may be interpreted by the controller 130 as indicating that a child is seated in the car seat 102. On the other hand, if the sensed weight is less than the predetermined weight, the weight sensor 122 can output a binary signal (i.e., 0) to the controller 130 that may be interpreted by the controller 130 as indicating that a child is not seated in the car seat 102. Also, the weight sensor 122 may be configured as a pressure switch that is configured to change position (open or close) based on the weight of an occupant in the car seat. Such a pressure switch can be connected to the controller 130 either via a wired or wireless connection as an input for determining whether a child is seated in the car seat.

The temperature sensor 170 is configured to sense the ambient temperature inside the vehicle in which the car seat 102 is installed. The temperature sensor can be any type of temperature sensor, such as a thermocouple or thermistor. The temperature sensor may have a temperature range of between about −40 F to 150 F. The temperature sensor 170 is configured to output a temperature signal to the controller 130.

The transceiver 140 is configured to selectively communicate via at least one mode of a dual-mode wireless interface that supports a local wireless communication link 142, such as Bluetooth, and a wide area wireless communication link 144, such as common cellular data communication. In one embodiment, the transceiver 140 communicates via the local wireless communication link 142 to a communication device 150 of a driver when the communication device 150 of the vehicle driver is within communication range of the transceiver 140 via the local wireless communication link 142 and otherwise communicates to a third party communication device 160 via the wide area wireless communication link 144 when the communication device 150 of the vehicle driver is outside of the range of the transceiver 140 via the local communication link 142. In one embodiment, the transceiver 140 includes a plurality of classes of Bluetooth transceivers such as class 2 and 3 Bluetooth transceivers to permit multiple local wireless communication link ranges to be detected. For example, in one embodiment, the transceiver 140 is comprised of a class 2 transceiver 140A and a class 3 transceiver 140B. The maximum range for a typical class 3 transceiver can be about 10 feet, while a typical range for a class 2 transceiver can be about 30 feet.

The communication device 150 of the driver may be a cellular telephone or other portable communication device capable of communicating with the transceivers 140A and 140B via local communication links 142A and 142B, respectively. In other embodiments, the communication device 150 of the driver may include at least one of a portable computer (such as a laptop or tablet computer), a personal digital assistant, and a pager. In one embodiment, the communication device 150 is capable of communicating via Bluetooth. The third party communication device 160 may include a communication device of a call center of a subscription (fee)-based monitoring service or a call center of emergency personnel (fire, police, EMS, etc.). The subscription based monitoring service may receive an alert message from the transceiver 140 and then contact emergency personnel based on the information in the alert message. In the case of an emergency personnel call center, the emergency personnel call center has a communication device that is constructed to directly receive an alert message from the transceiver 140 via the wide area wireless communication link 144. Such a direct link between the transceiver 140 and the emergency personnel may reduce the response time for emergency personnel to respond when compared to indirectly routing information from the alert message through a subscription based monitoring service.

The controller 130 communicates with the harness sensors 120, the weight sensor 122, the transceiver 140, and, optionally, the temperature sensor 170. The transceiver 140 is communicatively coupled to the controller 130 to receive data and/or commands from the controller 130 and to transmit data and/or commands to the controller 130. The harness sensors 120 are constructed to output harness position sensor signals, which are received by the controller 130, either wirelessly or via a wired connection 132. The weight sensor 122 is constructed to output a weight sensor signal, which is received by the controller 130, either wirelessly or via a wired connection 134. The transceiver 140 communicates with the communication device 150 of the vehicle driver or the communication device 160 of the third party in response to receiving commands and/or data from the controller 130 that are based on sensor signals received by the controller 130 from the harness sensors 120 and the weight sensor 122. The system 100 further includes one or more power supplies (not shown) that may supply power to the weight sensor 122, the controller 130, the transceiver 140, the temperature sensor 170, and the harness sensors 120.

Figure 3:
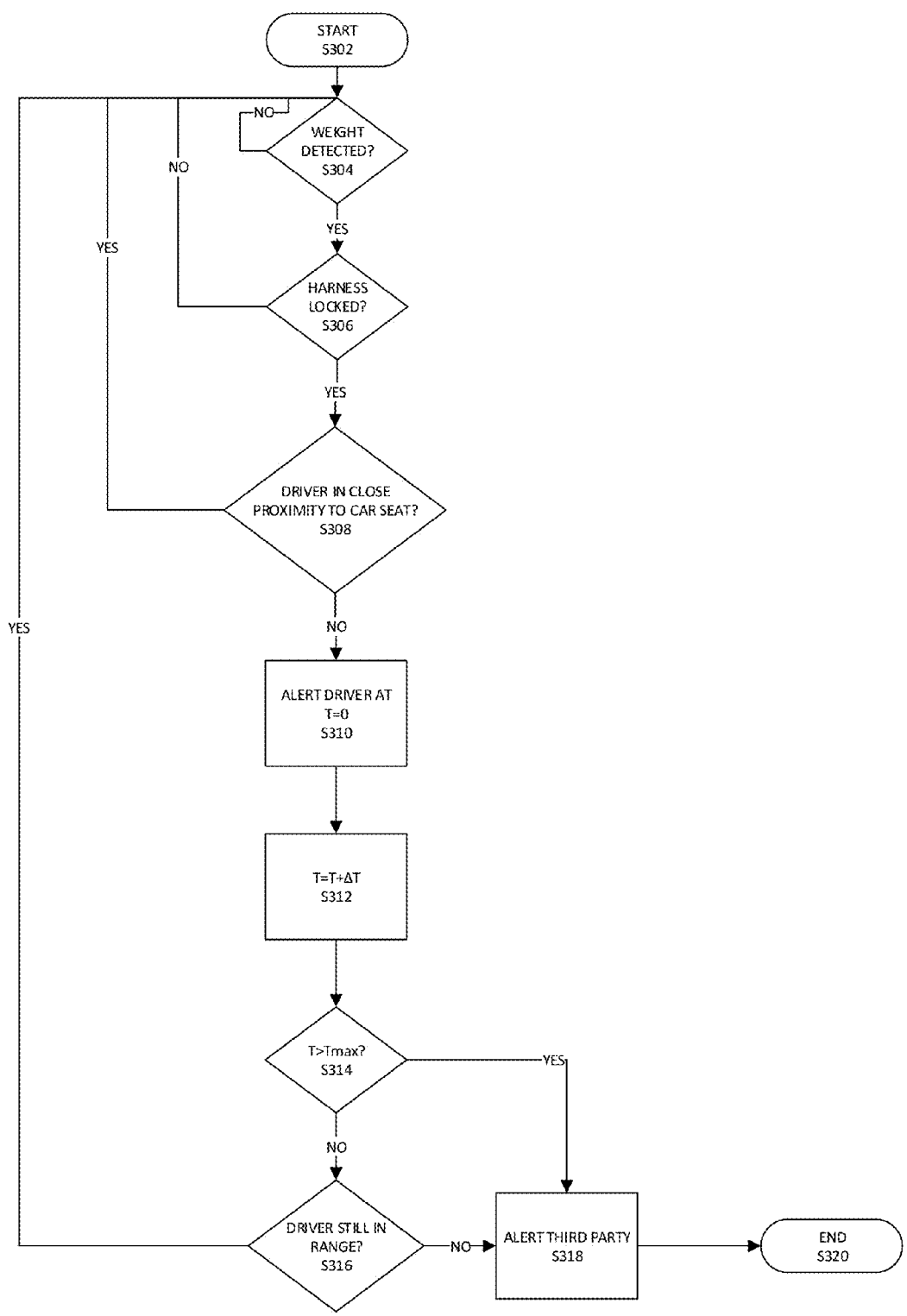
FIG. 3 is a flow chart of a detection and notification method in accordance with an embodiment of the invention.

In one embodiment, the controller 130 performs an occupant detection and alert notification method based on inputs the controller receives from the harness sensors 120 and the weight sensor 122 according to a workflow shown in FIG. 3. In one embodiment, the controller 130 has an on/off switch that permits the driver to manually disable the workflow shown in FIG. 3. Such a feature may be helpful for a driver who has an infant seated in the car seat 102 who has fallen asleep in the car seat 102 and who may wish to let the child continue to rest in the car seat 102 while the vehicle is parked in a home garage, for example. In such a case, the driver may wish to leave the vehicle and enter the home while the child is asleep. In one embodiment, the on/off switch will automatically revert back to an on state after a predetermined amount of time to avoid a driver from forgetting to re-enable the controller 130. For example, the predetermined time for re-enabling the car seat can be 2 hours. In one embodiment, the controller 130 can be continually manually overridden by the driver, however the driver will have to return to the controller 130 to toggle the on/off switch each time in order to force the driver to check on the status of the occupant of the car seat 102.

When the workflow begins at S302 it is assumed that an occupant is seated in the vehicle seat 102, the connectors 112A and 112B are connected to each other, the connectors 114A and 114B are connected to buckle 114C, and the system 100 is fully powered (i.e., the controller's on/off switch is set to on), and ready to perform the workflow. Thus, S302 may represent the state of the system 100 when a vehicle carrying the car seat 102, occupant, and driver has arrived at a destination and is parked. At S302, the transceiver 140 is paired (communicatively coupled) with the communication device 150 of the driver via the local wireless link 142 (i.e., Bluetooth pairing) and may be in a power saving mode (e.g., a sniff mode) with the communication device 150. At S304 the controller 130 determines from the output of the weight sensor 122 whether an occupant is in the seat 102. If an occupant is not detected in the car seat 102 (i.e., NO at S304), then the workflow returns to S304. If an occupant is detected in the car seat 102 (i.e., YES at S304), then the controller 130 determines at S306, from the outputs of the harness sensors 122, as discussed above, whether the harness 106 of the car seat 102 is locked. In one embodiment, if all of the harness connectors 112A, 112B, 114A, 114B are connected, the controller 130 determines that the harness 106 is locked. If it is determined that the harness 106 is not locked (i.e., NO at S306), then the workflow returns to S304. However, if the controller 130 determines that the harness 106 is locked (i.e., YES at S306), then the controller 130 determines at S308 whether the driver's communication device 150 is within range of a first Bluetooth transceiver 140A that communicates at a relatively close proximity (e.g., within about 10 feet) of the car seat 102.

The determination in S308 can be performed by having the controller 130 transmit a polling command to the transceiver 140 to poll the driver's communication device 150 using the first transceiver 140A. If the controller 130 determines that the driver's communication device 150 is within communication range of the first transceiver 140A (i.e., YES at S208), then the workflow returns to S304. However, if the controller 130 determines that the driver's communication device 150 is not within communication range of the first transceiver 140A, (i.e., NO at S208), then at S310 the controller 130 transmits a first message command and first alert message data to the transceiver 140 at time 0. The first message command instructs the transceiver 140 to compose a first alert message using the first alert message data and transmit the first alert message to the driver's communication device 150 using a second Bluetooth transceiver 140B (e.g., a higher power transceiver with a larger communication range than the first transceiver). An example of the content of the first alert message is shown in FIG. 4. At S310 the first alert message is composed and transmitted to the communication device 150 of the vehicle driver via the second transceiver 140B. After the first alert message is sent, at S312 a timer is incremented by a time period and a total elapsed time (measured from the transmission of the first alert message) is compared to a maximum time, Tmax (e.g., 5 minutes) at S314. If the total elapsed time is not greater than Tmax (i.e., NO at S314), then the controller 130 determines whether the driver's communication device 150 is still in communication range of the second transceiver 140B. If the controller 130 determines that the driver's communication device 150 is in range of the second transceiver 140B (i.e., YES at S316), then the workflow returns to S304. However, if the total elapsed time is greater than Tmax (i.e., YES at S314), or if the driver's communication device 150 is not in range of the second transceiver 140B (i.e., NO at S316), then the controller 130 sends a second message command and second message data to the transceiver 140 to send an alert to the third party communication device 160. The second message command instructs the transceiver 140 to compose a second alert message using the second alert message data and transmit the second alert message to the third party communication device 160 using the wide area communication link 144. In one embodiment, the transceiver 140 composes the second alert message as a text message and sends the second alert message to the third party communication device 160 via SMS using a cellular communications network. An example of the content of the second alert message is shown in FIG. 5. At S320 the workflow ends with the third party receiving the second alert message and taking further action in response to the second alert message.

Also, in one embodiment, the controller 130 may be communicatively coupled to the vehicle (via a wired or wireless connection) to operate various vehicle systems that can alert the driver (or bystanders) in the event that the driver is not carrying communication device 150 or responding thereto. For example, in one embodiment, the controller 130 can turn the vehicle horn and/or exterior lights on and off at S310 in conjunction with sending the first alert message. Such visual and acoustic signals may attract the driver's attention or a bystander who may be able to assist in responding to the signals.

There have been described and illustrated herein several embodiments of a car seat occupant detection apparatus, system, and method. While particular embodiments of the invention have been described, it is not intended that the invention be limited thereto, as it is intended that the invention be as broad in scope as the art will allow and that the specification be read likewise. Thus, while particular sensors have been disclosed, it will be appreciated that other sensors may be used as well. Moreover, while particular configurations have been disclosed in reference to a five-point harness of an exemplary car seat, it will be appreciated that other harness configurations could be used as well. It will therefore be appreciated by those skilled in the art that yet other modifications could be made to the provided invention without deviating from its spirit and scope as claimed.

What is claimed is:

1. A car seat occupant detection system for a car seat installed in a vehicle, said system comprising:
   at least one harness sensor for detecting whether connectors of a car seat harness are connected;
   a weight sensor for detecting the weight of an occupant in the car seat;
   a controller in communication with said at least one harness sensor and said weight sensor; and
   a transceiver communicatively coupled to said controller and configured to selectively communicate with a driver communication device via a local wireless communication link and with a third party communication device via a wide area wireless communication link,
   wherein said controller is constructed to determine whether or not an occupant in the car seat has been left in the car seat by a driver of the vehicle who has left the vehicle based on detections of said at least one harness sensor and said weight sensor, and a status of communication between said transceiver and said driver communication device via the local wireless communication link, and
   wherein in a case where said controller determines that an occupant in the car seat has been left in the car seat by the driver who has left the vehicle, said controller instructs said transceiver to send a first alert message to said driver communication device via said local wireless communication link if said driver communication device is in communication range of said local wireless communication link or instructs said transceiver to send a second alert message to said third party communication device via said wide area wireless communication link if said driver communication device is not in communication range of said local wireless communication link,
   wherein said driver communication device includes at least one of a telephone, a portable computer, a personal digital assistant, and a pager, and
   wherein said transceiver includes a first transceiver and a second transceiver and said local wireless communication link includes a first and second local wireless communication links, and the first transceiver is configured to communicate with said driver communication device via said first local wireless communication link having a first communication range and said second transceiver is configured to communicate with said driver communication device via said second local wireless communication link having a second communication range that is larger than the first communication range.

2. The system according to claim 1, wherein:
   said local wireless communication link is a Bluetooth link.
3. The system according to claim 1, wherein:
   said wide area wireless communication link is a cellular telephone network.
4. The system according to claim 1, further comprising:
   a temperature sensor in communication with said controller, said temperature sensor configured to sense the ambient temperature inside the vehicle in which the car seat is installed.
5. The system according to claim 1, wherein:
   said at least one harness sensor is a Hall-effect sensor.
6. A car seat occupant detection method, comprising:
   detecting the presence of an occupant in the car seat;
   detecting whether a harness of the car seat is locked;
   detecting whether or not a driver communication device is in communication range of a first local wireless communication link, wherein said first local wireless communication link has a communication range equal to said first predetermined distance;

determining, based on said detecting whether or not said driver communication device is in communication range of said first local wireless communication link, whether a driver communication device is beyond a first predetermined distance from the car seat;

sending a first alert message to said driver communication device when it is determined that an occupant is seated in the car seat, when it is detected that said harness is locked, and when it is determined that said driver communication device is beyond said first predetermined distance from the car seat;

detecting whether or not said driver communication device is in communication range of a second local wireless communication link;

determining, based on said detecting whether or not said driver communication device is in communication range of said second local wireless communication link, whether said driver communication device is beyond a second predetermined distance that is larger than the first predetermined distance; and sending a second alert message to a third party communication device when it is determined that said driver communication device is beyond said second predetermined distance.

7. The method according to claim 6, wherein:
said sending said second alert message includes sending said second message when it is determined that a predetermined time has elapsed from a time of sending said first alert message.

8. The method according to claim 6, wherein:
said second local wireless communication link has a communication range equal to said second predetermined distance.

9. The method according to claim 6, wherein:
said sending said first alert message to said driver communication device includes sending said first alert message via said second local wireless communication link.

10. The method according to claim 6, wherein:
said sending said second alert message to said third party includes sending said message via a wide area communication link.

11. The method according to claim 10, wherein:
said wide area communication link includes at least one of a cellular phone network and a satellite phone network.

12. The method according to claim 6, wherein:
said second alert message includes at least the location of the car seat.

13. The method according to claim 6, wherein:
said second alert message includes the ambient temperature inside the vehicle.

14. The method according to claim 11, wherein:
the second alert message is transmitted as an SMS message.

15. A car seat occupant detection apparatus for a car seat installed in a vehicle, said car seat coupled to at least one harness sensor, a weight sensor, and a transceiver, said system comprising:

a controller in communication with the at least one harness sensor, the weight sensor, and the transceiver, wherein said controller is constructed to determine whether or not an occupant in the car seat has been left in the car seat by a driver of the vehicle who has left the vehicle based on detections of said at least one harness sensor and said weight sensor, and a status of communication between said transceiver and a driver communication device via a local wireless communication link of said transceiver, and wherein in a case where said controller determines that an occupant in the car seat has been left in the car seat by the driver who has left the vehicle, said controller instructs said transceiver to send a first alert message to said driver communication device via said local wireless communication link if said driver communication device is in communication range of said local wireless communication link or instructs said transceiver to send a second alert message to a third party communication device via a wide area wireless communication link if said driver communication device is not in communication range of said local wireless communication link, wherein said at least one harness sensor detects whether connectors of a car seat harness are connected, said weight sensor detects the weight of an occupant in the car seat, and said transceiver selectively communicates with said driver communication device via a local wireless communication link and with a third party communication device via said wide area wireless communication link, and wherein said transceiver includes a first transceiver and a second transceiver and said local wireless communication link includes a first and second local wireless communication links, said first transceiver is configured to communicate with said driver communication device via said first local wireless communication link having a first communication range, and said second transceiver is configured to communicate with said driver communication device via said second local wireless communication link having a second communication range that is larger than said first communication range.

16. The car seat occupant detection apparatus according to claim 15, wherein:
said controller determines, based on a detection of whether or not said driver communication device is in communication range of said first local wireless communication link, whether a driver communication device is beyond a first predetermined distance from the car seat, and said controller determines, based on a detection of whether or not said driver communication device is in communication range of said second local wireless communication link, whether said driver communication device is beyond a second predetermined distance that is larger than said first predetermined distance.

* * * * *